United States Patent [19]

Bidal

[11] Patent Number: 4,840,086
[45] Date of Patent: Jun. 20, 1989

[54] DEVICE FOR FASTENING A SHOE ON A BICYCLE PEDAL

[75] Inventor: René M. R. Bidal, Labalme Sur Cerdon, France

[73] Assignee: Ste Look, Nevers, France

[21] Appl. No.: 193,722

[22] Filed: May 13, 1988

[30] Foreign Application Priority Data

Jun. 22, 1987 [FR] France ................................ 87 08730

[51] Int. Cl.⁴ ............................................ G05G 1/14
[52] U.S. Cl. .................................. 74/594.6; 74/594.4; 36/131
[58] Field of Search ................ 74/594.6, 594.4, 594.5; 36/131, 132

[56] References Cited

U.S. PATENT DOCUMENTS

| | | | |
|---|---|---|---|
| 3,952,428 | 4/1976 | Polsky | 36/131 |
| 4,030,774 | 6/1977 | Foster | 74/594.6 X |
| 4,628,763 | 12/1986 | Konzorr | 74/594.6 |
| 4,646,586 | 3/1987 | Rapisarda | 74/594.6 |
| 4,686,867 | 8/1987 | Bernard et al. | 74/594.6 |
| 4,739,564 | 4/1988 | Eser | 74/594.6 |
| 4,762,019 | 8/1988 | Beyl | 74/594.6 |

FOREIGN PATENT DOCUMENTS

| | | | |
|---|---|---|---|
| 0029192 | 5/1981 | European Pat. Off. | 36/131 |
| 0146454 | 6/1985 | European Pat. Off. | 74/594.6 |
| 2240102 | 2/1974 | Fed. Rep. of Germany | 36/131 |
| 2564414 | 11/1085 | France | 36/131 |
| 2510967 | 2/1983 | France | 36/131 |
| 2556687 | 4/1986 | France | 74/594.6 |
| 2588235 | 4/1987 | France | 74/594.6 |

Primary Examiner—Vinh Luong
Attorney, Agent, or Firm—Young & Thompson

[57] ABSTRACT

A device for fastening a shoe on a bicycle pedal essentially comprises at least one retaining member attached to the undersurface of the sole of the shoe, the retaining member being provided with a rear retaining recess having a rearwardly directed opening and with a front retaining recess having a forwardly directed opening. Rear and front anchoring members on the pedal are provided respectively with rear and front anchoring elements located at a longitudinal distance from each other which is slightly shorter than or equal to the distance between the rear retaining recess and the front retaining recess of the retaining member attached to the shoe so as to be capable of engaging and locking respectively within the rear retaining recess and the front retaining recess in order to fix the shoe on the pedal.

8 Claims, 3 Drawing Sheets

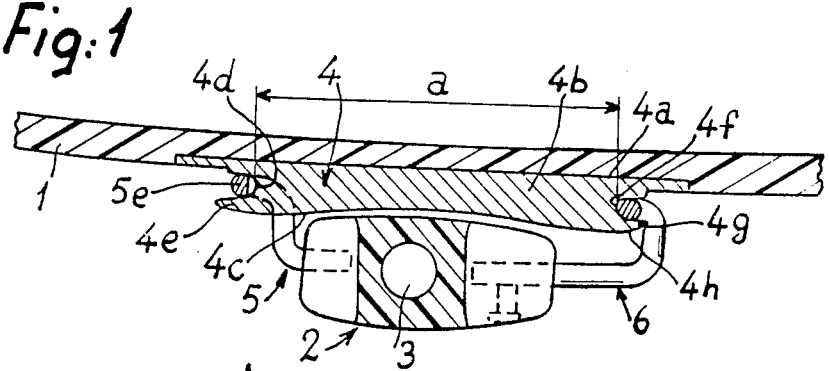
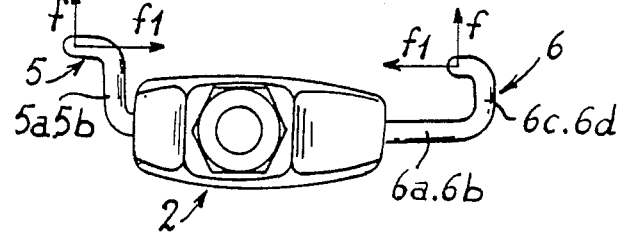
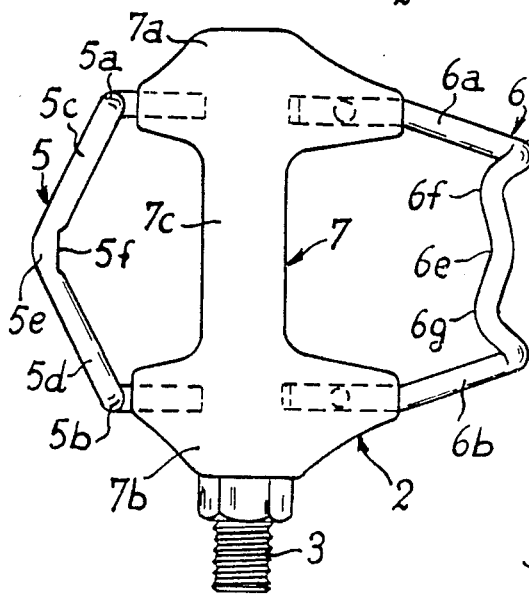
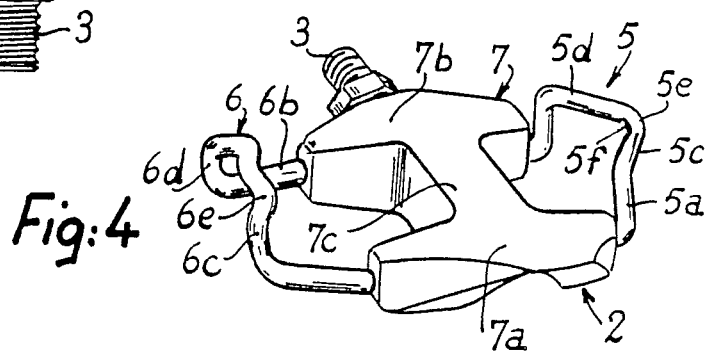

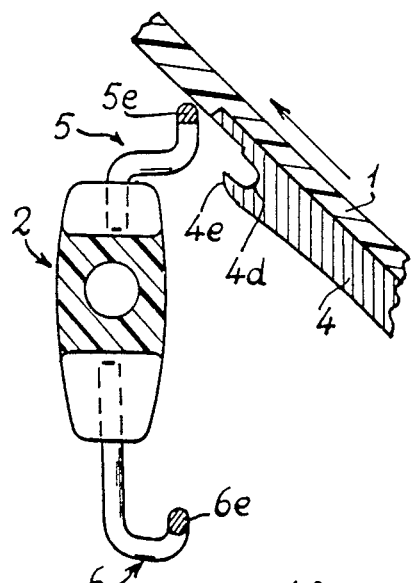
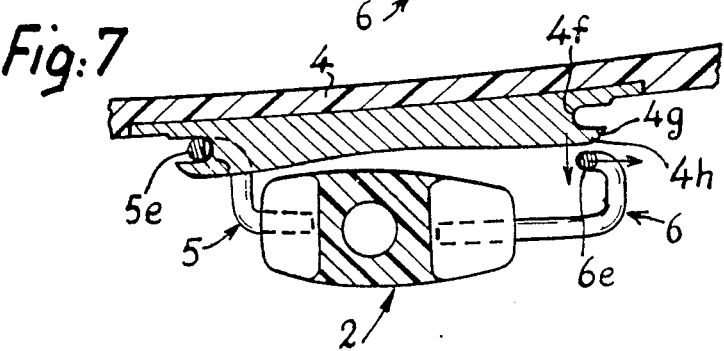
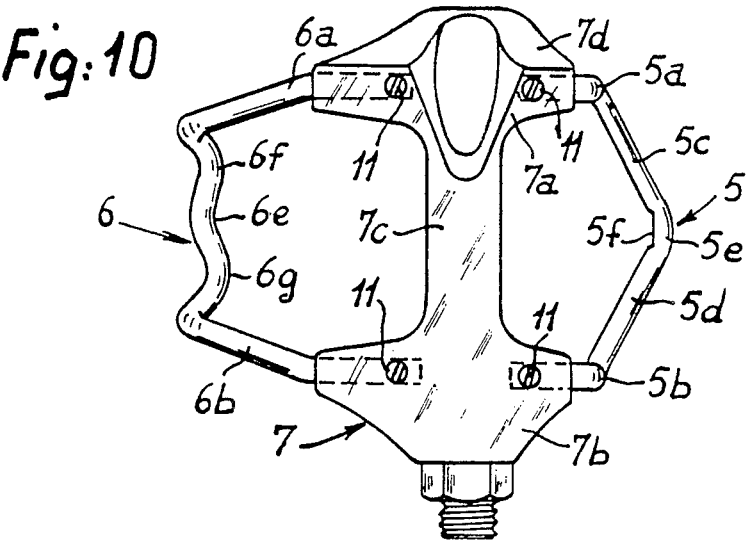

DEVICE FOR FASTENING A SHOE ON A BICYCLE PEDAL

BACKGROUND OF THE INVENTION

1. Field of the Invention

The present invention relates to a device for fastening a shoe on a bicycle pedal.

2. Description of the Prior Art

In order to maintain a cyclist's shoe firmly in position of a bicycle pedal, it is a current practice to employ toe-clips which serve to exert not only efforts of downward thrust but also efforts of upward traction. Although the use of toe-clips enables a cyclist to become perfectly integrated with his machine, it is for this very reason that there is also a serious potential danger in the event of a fall while cycling. In order to overcome this disadvantage, it has been endeavored to find other devices for fastening a shoe on a bicycle pedal, essentially with a view to improving the connection between the shoe and the pedal while at the same time permitting easy disengagement of the shoe in the event of a fall. One of these known devices is described in patent No. FR-A-2,556,687. This device comprises a pedal which makes it possible to obtain a good connection with a shoe but is nevertheless subject to a certain number of drawbacks. In the first place, the pedal is relatively heavy and cumbersome, its streamlining is imperfect and the possibilities of release of the shoe are limited since separation of the shoe, once this latter is engaged, can take place only by outward rotation of the foot. Moreover, engagement of the shoe in the pedal makes it necessary for the cyclist to look at the pedal in order to fit the toe-clip by reason of the fact that the toe end of the shoe has to be engaged first. Finally, the presence of a support plate which is fixed beneath the shoe and is necessary for the purpose of locking the pedal/foot pair makes it impossible to walk with this type of shoe. This support plate is provided with engagement points which have no relief openings and are liable to clog immediately if the cyclist places his foot in mud, for example. The numerous consequences can readily be imagined and limit the economic scope of the system.

SUMMARY OF THE INVENTION

The aim of the present invention is to overcome these disadvantages by providing a particularly simple and lightweight fastening device which is not liable to clog, which is easy to manufacture, which is streamlined and permits very easy engagement of the shoe.

To this end, said device for fastening a shoe on a bicycle pedal essentially comprises at least one retaining member attached to the underface of the sole of the shoe, said retaining member being provided with a rear retaining recess having a rearwardly directed opening and with a front retaining recess having a forwardly directed opening, provision being made on the pedal for rear and front anchoring members provided respectively with rear and front anchoring elements located at a longitudinal distance from each other which is slightly shorter than or equal to the distance between the rear retaining recess and the front retaining recess of the retaining member or members attached to the shoe so as to be capable of engaging and locking respectively within the rear retaining recess and the front retaining recess in order to fix the shoe on the pedal.

BRIEF DESCRIPTION OF THE DRAWINGS

FIG. 1 is a vertical longitudinal sectional view of a device for fastening a shoe on a bicycle pedal in accordance with the invention.

FIG. 2 is a profile view of the pedal.

FIG. 3 is a plan view of the pedal.

FIG. 4 is a perspective view of the pedal.

FIGS. 6 and 7 are longitudinal sectional views illustrating the different steps of the operation involving engagement of the shoe on the pedal.

FIG. 10 is a bottom view of an alternative embodiment of the pedal.

DESCRIPTION OF THE PREFERRED EMBODIMENTS

Figure 5:
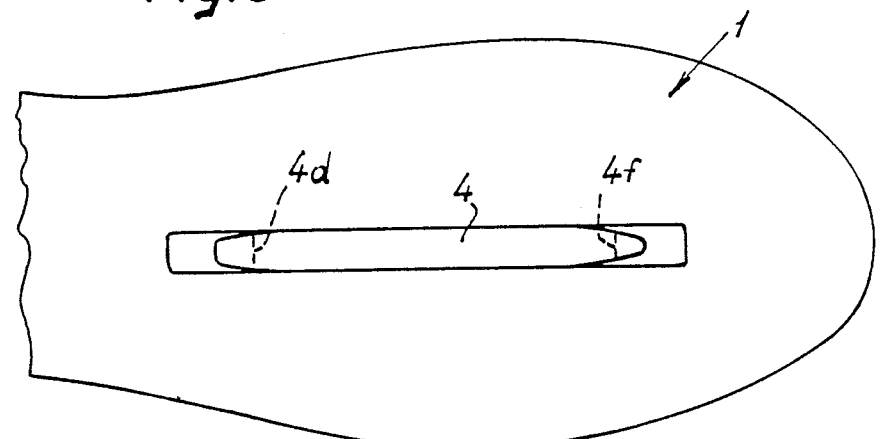
FIG. 5 is a bottom view of the shoe which carries the coupling strip.

The device in accordance with the invention has the intended function of fastening a shoe as represented partially by its sole 1 on a bicycle pedal 2 which is rotatably mounted in the conventional manner on the horizontal pedal spindle 3 of a pedal crank gear.

The fastening device comprises beneath the sole 1 a longitudinal retaining strip 4 which is attached to the sole 1 by any suitable means. Said retaining strip 4 can be flush-mounted by means of a base 4a within a longitudinal groove formed in the bottom face of the sole 1 and can be fixed by means of screws. Said retaining strip 4 also has a central portion 4b of greater thickness which extends over the greater part of the length of the base 4a and has an underface 4c. At the rear end of the central portion 4b of the strip 4 is formed a recess 4d which is directed horizontally toward the rear and the lower portion of which is delimited by a nose 4e. At its front end, the strip 4 is provided with a recess 4f which is directed toward the front end, which is of smaller depth than the recess 4d and the lower portion of which is delimited by a nose 4g which is directed toward the front end. Said recess 4f has a bottom surface 4h which is advantageously rounded in the downward and rearward direction and which is joined to the underface 4c.

The pedal 2 is so designed as to carry a rear anchoring member 5 and a front anchoring member 6 which are adapted to cooperate with the retaining strip 4. These front and rear anchoring members 5 and 6 can consist of two lengths of bent piano wire which are fixed in the central body 7 of the pedal, preferably in an adjustable manner, said central body being advantageously formed of molded plastic. Said pedal body 7 has two lateral portions 7a, 7b of substantial thickness which are joined to each other by means of a cross-piece 7c of smaller width, said cross-piece being traversed by the spindle of the pedal 2.

The rear anchoring member 5 has two elbowed arms 5a, 5b which extend from the point of emergence from the two thick lateral portions 7a, 7b of the pedal body 7. Said elbowed portions 5a, 5b are extended at the upper ends thereof by two horizontal arms 5c, 5d which join each other so as to form a forwardly-directed open obtuse angle of approximately 120° to 130°. Preferably, the two horizontal arms 5c and 5d are joined to each other by means of a short transverse arm 5e at the location corresponding to the vertex of the obtuse angle. Said short central arm 5e which may be provided if necessary with a vertical flat portion 5f on the front face thereof is intended to fit within the rear recess 4d of the retaining strip 4 in the attachment position as shown in FIG. 1. The flat portion 5f produces a triangulation effect which hardens the system at the time of disengagement.

The front anchoring member 6 which is also formed of piano wire has two lateral arms 6a, 6b which extend substantially horizontally in the forward direction from the two thick portions 7a, 7b of the pedal 7. These two lateral arms 6a, 6b converge toward each other and extend upwards in the form of respective bent arms 6c, 6d which are substantially vertical. These bent vertical arms 6c, 6d are joined together at the upper ends by means of a horizontal and transverse arm in the form of an obtuse angle in the vicinity of 180° which is open toward the rear. The central portion of the horizontal arm has a slight kink 6e which is formed in the upper rear portion of this latter and located between two shoulders 6f, 6g constituted by rearwardly extending bosses.

The distance a between the short central arm 5e of the rear anchoring member 5 and the kink 6e of the front anchoring member 6 is chosen so as to be equal to or slightly shorter than the distance between the bottom of the rear recess 4d and the bottom of the front recess 4f of the retaining strip so as to carry out the attachment as indicated in the foregoing.

FIGS. 6 and 7 illustrate the manner in which the shoe is fastened to the pedal 2. Normally, when the pedal 2 is free, it assumes a vertical position by reason of its unbalance with respect to its spindle 3. In this vertical position, the rear anchoring member 5 and front anchoring member 6 are located respectively in top and bottom positions while being directed toward the front. In order to engage each shoe, the cyclist places the shoe in front of the pedal in a position in which it is slightly inclined in the downward direction as shown in FIG. 6. While moving the shoe backwards, the cyclist then causes engagement of the short central arm 5e of the rear anchoring member 5 within the rear recess 4d of the retaining strip 4. The arms 5c, 5d of the rear anchoring member 5 then perform a guiding function so as to bring the rear recess 4d opposite to the central arm 5e. The cyclist then produces a pivotal displacement of the pedal 2 in the anticlockwise direction, whereupon it is only necessary to exert a slight pressure on the shoe in the forward direction in order to lock this latter on the pedal 2. In fact, as shown in FIG. 7, during this movement, the curved bottom ramp 4h of the front nose 4g exerts a slight forward thrust on the central portion 6e of the front anchoring member 6 and said central portion then returns elastically toward the rear while falling into its housing within the front recess 4f. From this moment onwards, the shoe is securely attached to the pedal 2 while resting solely on the two anchoring members 5, 6 without any contact with the pedal body 7, as shown in FIG. 1. The front recess 4f of the retaining strip 4 is then retained laterally by the two shouldered portions 6f, 6g. Release of the shoe can take place only in a movement of pivotal displacement of said shoe about an axis perpendicular to the pedal 2. During this movement, one of the shouldered portions 6f, 6g is thrust forward as a result of the elasticity of the piano wire which constitutes the front anchoring member 6.

While the cyclist is pedaling and when the shoe exerts an upward tractive force, this force is transmitted by the rear recess 4d and the front recess 4f, respectively to the central arm 5e and to the kink 6e by applying at these points upwardly directed forces as indicated by the arrows f in FIG. 2. These forces f result in horizontal forces f1 which are directed toward each other and tend to draw the two anchoring members 5 and 6 toward each other and therefore to increase the application of pressure of the shoe on the pedal.

Figure 8:
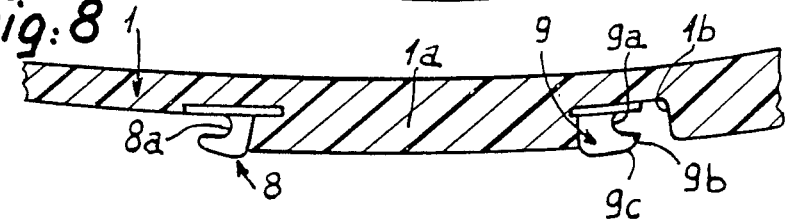
FIG. 8 is a vertical longitudinal sectional view of an alternative embodiment comprising two independent retaining hooks beneath the sole of the shoe.
Figure 9:
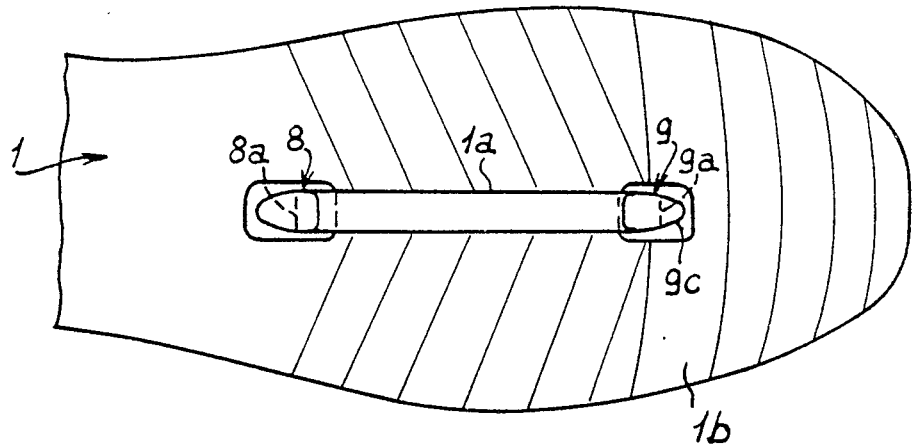
FIG. 9 is a bottom view of the shoe comprising two independent retaining hooks.

In the alternative embodiment of the invention which is illustrated in FIGS. 8 and 9, the sole of the shoe no longer carries a single longitudinal retaining strip 4 but is adapted to carry instead two separate retaining hooks, namely a rear retaining hook 8 and a front retaining hook 9 which are spaced in the longitudinal direction at the distance a between the central portions 5e and 6e of the two retaining members. The rear retaining hook 8 is provided in its rear face with a rearwardly directed recess 8a and the front retaining hook 9 is provided in its front face with a recess 9a beneath which extends a nose 9b delimited by a downwardly and rearwardly inclined bottom face 9c. The recesses 8a and 9a perform exactly the same function as the recesses 4d and 4f of the retaining strip 4. In this form of construction, the sole 1 preferably has a longitudinal rib 1a which extends between the two retaining hooks 8, 9 in order to prevent the front portion of the pedal from engaging behind the front retaining hook 9. Said rib 1a has the same thickness as the other sole treads and the retaining hooks 8, 9 so as to permit normal walking on the soles. Furthermore, a lateral clearance space 1b is provided in the sole over the entire width of this latter and in front of the front retaining hook 9.

In the alternative embodiment of the invention as illustrated in FIG. 10, the portion 7b of the body 7 of the pedal located on the off-side of the bicycle advantageously has an outer face 7d which is downwardly and inwardly inclined in order to increase the ground clearance of the pedal when the bicycle is inclined. Moreover, the anchoring members are mounted so as to permit of longitudinal adjustment on the body 7 and are locked in the desired position by means of screws 11 screwed into the body 7.

Although in the embodiment of the invention which has been described in the foregoing the pedal 2 is constituted by two lengths of bent piano wire 5 and 6 which are rigidly fixed to a pedal body 7 of molded plastic, it is readily apparent that, in an alternative embodiment, the entire pedal 2 including the rear and front anchoring points 5 and 6 could be formed of a single piece of molded plastic.

The pedal 2 could also be fabricated from a single metal part suitably die-stamped so as to constitute both the central body of the pedal and the two front and rear anchoring members 5 and 6.

What is claimed is:

1. A device for fastening a shoe to a bicycle pedal, which comprises in combination:
   at least one retaining member attached to the underface of the sole of the shoe, said retaining member being provided with a rear retaining recess which opens rearwardly and with a front retaining recess which opens forwardly,
   a bicycle pedal comprising a pedal body having a spindle and carrying a rear anchoring member and a front anchoring member, said anchoring members being adapted for respectively being engaged inside said rear and front retaining recesses of said retaining member attached to the underface of said sole of the shoe, each of said anchoring members being formed of a length of resilient metal wire, said metal wire forming the rear anchoring member comprising two horizontal arms joined to one another so as to define between said arms an obtuse angle which faces said pedal, said metal wire forming said front anchoring member comprising a horizontal transverse arm spaced from and attached to said pedal by two rearwardly extending portions of said metal wire, a slight kink being formed between said rearwardly extending portions in a central portion of said transverse arm, said kink capable of engaging said front retaining recess of said retaining member atached to the sole of said shoe, while the apex of said obtuse angle of said rear anchoring member is engaged inside said rear retaining recess of said retaining member.

2. A fastening device according to claim 1, wherein said rear anchoring member comprises two elbowed arms extending vertically from said pedal body, said arms being provided at their upper extent with extensions comprising said two horizontal arms of said rear anchoring member.

3. A fastening device according to claim 1, wherein said front anchoring member comprises two lateral arms extending substantially horizontally in the forward direction from said pedal body, said two lateral arms converging towards each other and being provided with upward extensions in the form of substantially vertical arms which are joined to each other at the upper extent thereof by said horizontal transverse arm.

4. A fastening device according to claim 3, wherein the horizontal transverse arm of the front anchoring member defines an obtuse angle which faces said pedal body.

5. A fastening device according to claim 1, wherein said retaining member comprises a longitudinal strip on the rear end of which is formed said rearwardly directed recess which recess is delimited at a lowermost portion thereof by a rearward extension, while said front end of said strip includes said forwardly directed recess which is delimited at a lowermost portion thereof by a forward extension, said forward extension having a bottom surface which is rounded in the downward and rearward direction.

6. A fastening device according to claim 1, wherein said body of said pedal comprises two spaced apart lateral portions which are joined to each other by means of a transverse crosspiece of narrower width than said two lateral portions, said spindle traversing said pedal body through said transverse crosspiece.

7. A fastening device according to claim 1, wherein said obtuse angle defined by said two horizontal arms of said rear anchoring member ranges from about 120° to 130°.

8. A fastening device according to claim 1, further including means to adjust the positioning of said front and rear anchoring members in relation to said pedal body.

* * * * *